US010430666B2

(12) United States Patent
Koyama et al.

(10) Patent No.: US 10,430,666 B2
(45) Date of Patent: Oct. 1, 2019

(54) TARGET OBJECT IDENTIFYING DEVICE, TARGET OBJECT IDENTIFYING METHOD AND TARGET OBJECT IDENTIFYING PROGRAM (71) Applicant: NEC Corporation, Minato-ku, Tokyo (JP)

(72) Inventors: Kazuya Koyama, Tokyo (JP); Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/765,621

(22) PCT Filed: Jan. 31, 2014

(86) PCT No.: PCT/JP2014/000523
§ 371 (c)(1),
(2) Date: Aug. 4, 2015

(87) PCT Pub. No.: WO2014/155922
PCT Pub. Date: Oct. 2, 2014

(65) Prior Publication Data
US 2015/0371403 A1 Dec. 24, 2015

(30) Foreign Application Priority Data

Mar. 29, 2013 (JP) ................. 2013-072178

(51) Int. Cl.
G06K 9/00 (2006.01)
G06K 9/32 (2006.01)
G06T 7/292 (2017.01)

(52) U.S. Cl.
CPC ..... *G06K 9/00771* (2013.01); *G06K 9/00288* (2013.01); *G06K 9/3241* (2013.01);
(Continued)

(58) Field of Classification Search
CPC ........... G06K 9/00771; G06K 9/00288; G06K 9/00261; G06K 9/00362; G06K 9/3241;
(Continued)

(56) References Cited

U.S. PATENT DOCUMENTS 9,842,261 B2 * 12/2017 Takano ................ B60R 25/305
2004/0161133 A1 * 8/2004 Elazar .................. G01S 3/7864
382/115
(Continued)

FOREIGN PATENT DOCUMENTS

JP 2008-152736 A 7/2008
JP 2010-039580 A 2/2010
(Continued)

OTHER PUBLICATIONS

International Search Report for PCT Application No. PCT/JP2014/000523, dated Apr. 22, 2014.

*Primary Examiner* — Shaghayegh Azima (57) ABSTRACT

Monitoring target matching means 71 matches monitoring targets shown in video captured by one or more imaging devices, and identifies monitoring targets estimated to be the same monitoring target, as an identified monitoring target. Target object identifying means 72 identifies a desired target object from one or more identified monitoring targets captured, using imaging times of each of the one or more identified monitoring targets.

9 Claims, 7 Drawing Sheets (52) U.S. Cl.
CPC .... *G06T 7/292* (2017.01); *G06T 2207/10016* (2013.01); *G06T 2207/30201* (2013.01); *G06T 2207/30232* (2013.01)

(58) Field of Classification Search
CPC . G06T 2207/30232; G06T 2207/10016; G06T 2207/30201
See application file for complete search history.

(56) References Cited

U.S. PATENT DOCUMENTS

| | | | | |
|---|---|---|---|---|
| 2010/0080418 | A1* | 4/2010 | Ito | G06K 9/00228 382/103 |
| 2011/0199486 | A1* | 8/2011 | Moriya | G06Q 30/02 348/150 |
| 2011/0316700 | A1* | 12/2011 | Kasahara | G08B 29/185 340/541 |
| 2014/0005929 | A1* | 1/2014 | Gale | G08G 1/096716 701/431 |

FOREIGN PATENT DOCUMENTS

| | | |
|---|---|---|
| JP | 2012-039531 A | 2/2012 |
| JP | 2012-078950 A | 4/2012 |
| JP | 2012-238111 A | 12/2012 |

\* cited by examiner

| PERSON IMAGE ID | PERSON IDENTIFICATION INFORMATION | IMAGING TIME | CAMERA NAME | PERSON IMAGE |
|---|---|---|---|---|
|  |  |  |  |  |
|  |  |  |  |  |

FIG. 3

| PERSON ID | PERSON IMAGE ID | IMAGING INFORMATION | | |
|---|---|---|---|---|
| | | IMAGING COUNT | EARLIEST IMAGING TIME | LATEST IMAGING TIME |
| A |  |  |  |  |
| B |  |  |  |  |

FIG. 4

| PERSON ID | PERSON IMAGE ID | IMAGING INFORMATION | | |
|---|---|---|---|---|
| | | IMAGING TIME | CAMERA NAME | PROBABILITY |
| A |  |  |  |  |
|  |  |  |  |  |

| (SECONDS) | CAMERA1 | CAMERA2 | CAMERA3 |
|---|---|---|---|
| CAMERA1 | 10 | - | - |
| CAMERA2 | 50 | 10 | - |
| CAMERA3 | 30 | 40 | 10 |

FIG. 7

| PERSON IMAGE ID | IMAGING TIME | CAMERA NAME |
|---|---|---|
| 1 | 00:00:00 | CAMERA1 |
| 2 | 00:00:30 | CAMERA2 |
| 3 | 00:00:45 | CAMERA3 |

TARGET OBJECT IDENTIFYING DEVICE, TARGET OBJECT IDENTIFYING METHOD AND TARGET OBJECT IDENTIFYING PROGRAM

This application is a National Stage Entry of PCT/JP2014/000523 filed on Jan. 31, 2014, which claims priority from Japanese Patent Application 2013-072178 filed on Mar. 29, 2013, the contents of all of which are incorporated herein by reference, in their entirety.

TECHNICAL FIELD

The present invention relates to a target object identifying device, target object identifying method, and target object identifying program for identifying a desired target object from monitoring targets.

BACKGROUND ART

Surveillance cameras are installed in stations, specific facilities, and the like, and video captured by the surveillance cameras is analyzed to perform various determination. As an example, a person or object present in a monitoring range for an unusually long time is identified as a suspicious person or object.

As a relevant technique, a behavior analysis method of tracking a specific person and analyzing his or her behavior is known. In the behavior analysis method, for example, where the specific person is present is recognized using one camera or a plurality of cameras that overlap in monitoring area, and the temporal changes of the position of the person are tracked to determine where and how long the person stayed.

A person recognition method of performing face matching to recognize a specific person from a captured image is known, too. Patent Literature (PTL) 1 describes a face image recognition device capable of a faster face image recognition process to simplify registration operation. The face image recognition device described in PTL 1 registers a frontal face image of each person to be recognized and an average face image of the person in an orientation other than the front, and matches the features of a face area extracted from video against the registered face images to recognize the face image in the video.

CITATION LIST

Patent Literature(s)

PTL 1: Japanese Patent Application Laid-Open No. 2012-238111

SUMMARY OF INVENTION

Technical Problem

With the above-mentioned behavior analysis method, the range in which the behavior of the person can be analyzed depends on the imaging range of the camera(s). For example, in the case where one camera is used, the range in which the behavior of the person can be analyzed is limited to the range that can be captured by the camera. To cover many ranges, a lot of cameras need to be used with no gap between the monitoring ranges. Besides, when capturing the person in a crowded situation, the person is often unable to be seen with other people in the way, and thus it is difficult to completely track the specific person.

In the case of using the face image recognition device described in PTL 1, information of any suspicious person to be found needs to be provided beforehand. In other words, the face image recognition device described in PTL 1 cannot be used in a situation where who is suspicious is unknown.

The present invention accordingly has an object of providing a target object identifying device, target object identifying method, and target object identifying program capable of, even in the case where the monitoring range is wide or crowded, identifying a target object present in the range for an unusually long time from monitoring targets.

Solution to Problem

A target object identifying device according to the present invention includes: monitoring target matching means which matches monitoring targets shown in video captured by one or more imaging devices, and identifies monitoring targets estimated to be the same monitoring target, as an identified monitoring target; and target object identifying means which identifies a desired target object from one or more identified monitoring targets, using imaging times of each of the one or more identified monitoring targets.

A target object identifying method according to the present invention includes: matching monitoring targets shown in video captured by one or more imaging devices, and identifying monitoring targets estimated to be the same monitoring target, as an identified monitoring target; and identifying a desired target object from one or more identified monitoring targets, using imaging times of each of the one or more identified monitoring targets.

A target object identifying program according to the present invention causes a computer to execute: a monitoring target matching process of matching monitoring targets shown in video captured by one or more imaging devices, and identifying monitoring targets estimated to be the same monitoring target, as an identified monitoring target; and a target object identifying process of identifying a desired target object from one or more identified monitoring targets, using imaging times of each of the one or more identified monitoring targets.

Advantageous Effects of Invention

According to the present invention, even in the case where the monitoring range is wide or crowded, a target object present in the range for an unusually long time can be identified from monitoring targets.

DESCRIPTION OF EMBODIMENT(S)

The following describes an exemplary embodiment of the present invention with reference to drawings. In the following description, the case where persons as a typical example of monitoring targets are monitored and any person staying in the monitoring range for an unusually long time is identified as a target object is used as an example. The monitoring targets are, however, not limited to persons. For example, the monitoring targets may be objects such as cars. In this case, any car parked in the monitoring range for a long time is identified as a target object. In the present invention, the term "target object" includes not only an object but also a person.

Figure 1:
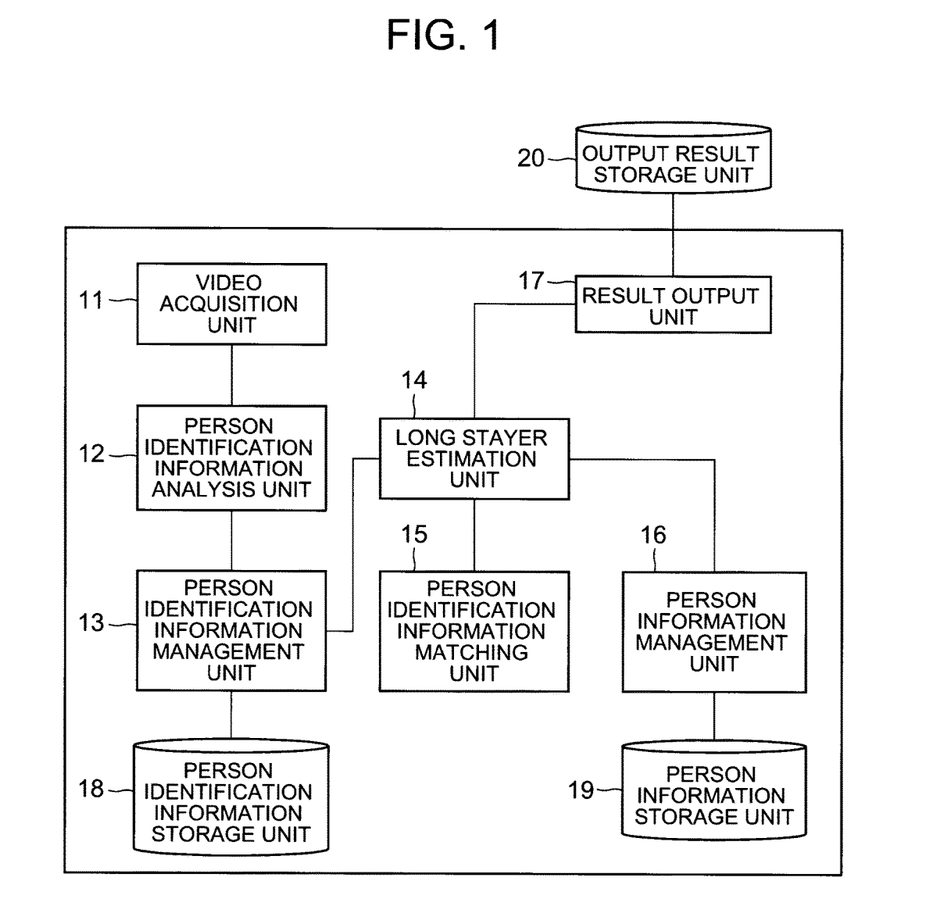
FIG. 1 It is a block diagram depicting a structural example of an exemplary embodiment of a target object identifying device according to the present invention.

FIG. 1 is a block diagram depicting a structural example of an exemplary embodiment of a target object identifying device according to the present invention. The target object identifying device in this exemplary embodiment includes a video acquisition unit 11, a person identification information analysis unit 12, a person identification information management unit 13, a long stayer estimation unit 14, a person identification information matching unit 15, a person information management unit 16, a result output unit 17, a person identification information storage unit 18, and a person information storage unit 19.

The video acquisition unit 11 acquires video of a predetermined monitoring range. The video acquisition unit 11 also acquires the time (hereafter referred to as "imaging time") at which the video was acquired. The video acquisition unit 11 outputs the video of the monitoring range and the time (i.e. the imaging time) at which the video was captured, to the person identification information analysis unit 12. The video acquisition unit 11 is realized, for example, by an imaging device such as a camera.

Although the target object identifying device depicted in FIG. 1 as an example includes only one video acquisition unit 11, the number of video acquisition units 11 is not limited to one, and may be two or more. The respective imaging ranges of the video acquisition units 11 may partly overlap each other, and may have no overlap with each other. In the case where the target object identifying device includes a plurality of video acquisition units 11, each video acquisition unit 11 may also output information (hereafter referred to as "imaging device identification information") for identifying the video acquisition unit 11 when outputting the acquired video to the person identification information analysis unit 12.

In this exemplary embodiment, the video acquisition unit 11 is preferably installed in a facility to be monitored so that a range which particularly requires observation can be captured. The video acquisition unit 11 does not need to be installed so as to capture the entire range of the facility.

The person identification information analysis unit 12 analyzes a monitoring target shown in the video captured by each video acquisition unit 11. In detail, upon detecting a monitoring target in the video, the person identification information analysis unit 12 extracts information (hereafter referred to as "monitoring target imaging information") including the identification information (hereafter referred to as "monitoring target identification information") of the monitoring target and the imaging time at which the monitoring target was captured.

The contents of the monitoring target identification information extracted by the person identification information analysis unit 12 are set beforehand depending on the type of monitoring targets. As an example, in the case where the monitoring targets are persons, the person identification information analysis unit 12 may, upon detecting a person in the video, extract the person's face image as the monitoring target identification information. As another example, in the case where the monitoring targets are cars, the person identification information analysis unit 12 may, upon detecting a car in the video, extract the car's registration plate image as the monitoring target identification information.

The information extracted by the person identification information analysis unit 12 is not limited to the face image or the car registration plate image. Any information for identifying the monitoring target may be extracted. Monitoring target identification information used for identifying a person may be referred to as "person identification information". Since the method of extracting specific identification information from a target image is widely known, its detailed description is omitted here.

In the case where no explicit imaging device identification information is provided from each video acquisition unit 11, the person identification information analysis unit 12 may, upon receiving video from each video acquisition unit 11, assign imaging device identification information according to the video acquisition unit 11 from which the video has been received.

The person identification information management unit 13 stores the information analyzed by the person identification information analysis unit 12, in the person identification information storage unit 18. The person identification information management unit 13 also extracts necessary information from the person identification information storage unit 18 and provides the extracted information to the person information management unit 16, in response to a request from the person information management unit 16.

The person identification information storage unit 18 stores the information analyzed by the person identification information analysis unit 12. In detail, the person identification information storage unit 18 stores an identifier for identifying individual monitoring target imaging information, and the monitoring target identification information and imaging time included in the monitoring target imaging information, in association with each other.

Figure 2:
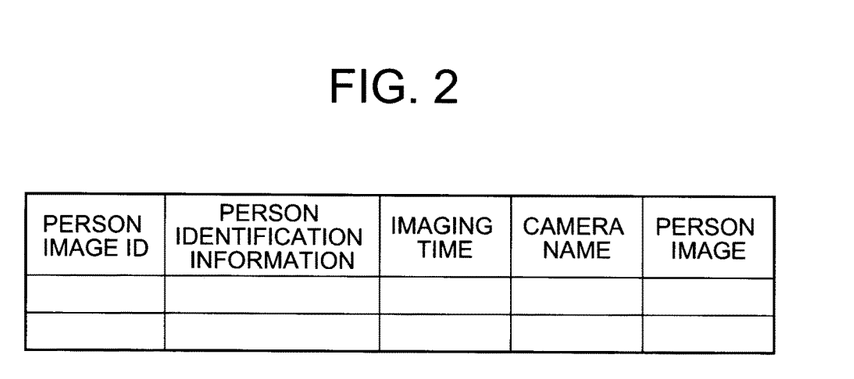
FIG. 2 It is an explanatory diagram depicting an example of information stored in a person identification information storage unit 18.

FIG. 2 is an explanatory diagram depicting an example of information stored in the person identification information storage unit 18. FIG. 2 depicts an example of information stored in the person identification information storage unit 18 in the case where the monitoring targets are persons. In the example depicted in FIG. 2, a person image ID is used as the identifier for identifying the monitoring target imaging information, and person identification information is used as the monitoring target identification information. The person identification information storage unit 18 may also store the camera name (e.g. imaging device identification information) of the camera that acquired the video and the person image detected by the person identification information analysis unit 12, as depicted in FIG. 2 as an example.

The person information management unit 16 stores information matched by the person identification information matching unit 15, in the person information storage unit 19. The person information management unit 16 also extracts necessary information from the person information storage unit 19 and provides the extracted information to the long stayer estimation unit 14, in response to a request from the long stayer estimation unit 14.

Figure 3:
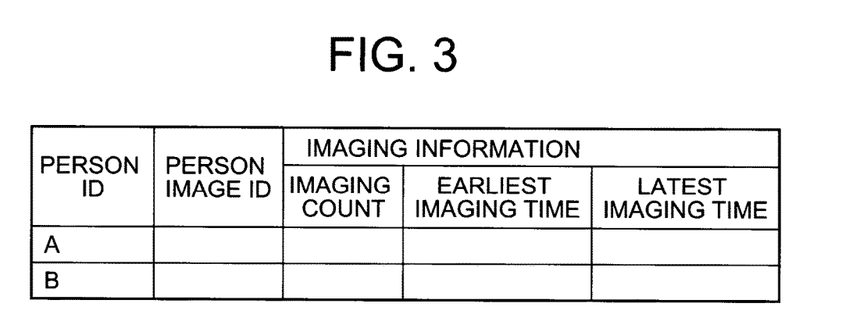
FIG. 3 It is an explanatory diagram depicting an example of information stored in a person information storage unit 19.

The person information storage unit 19 stores each identified monitoring target and the imaging times of the monitoring target. FIG. 3 is an explanatory diagram depicting an example of information stored in the person information storage unit 19. FIG. 3 depicts an example of information stored in the person information storage unit 19 in the case where the monitoring targets are persons. In the example depicted in FIG. 3, the person information storage unit 19 stores, for each piece of person identification information (person ID), the identifier (person image ID) of the monitoring target imaging information from which the person has been extracted, the imaging count of the person, the earliest time (hereafter referred to as "earliest imaging time") at which the person was captured, and the latest time (hereafter referred to as "latest imaging time") at which the person was captured, in association with each other.

Figure 4:
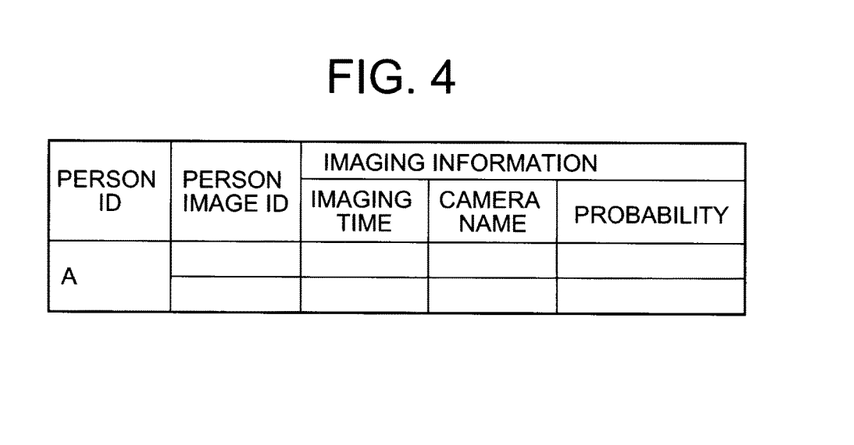
FIG. 4 It is an explanatory diagram depicting another example of information stored in the person information storage unit 19.

The form in which the imaging times of each identified monitoring target are stored in the person information storage unit 19 is not limited to that depicted in FIG. 3 as an example. The person information storage unit 19 may store each individual imaging time of the identified monitoring target. FIG. 4 is an explanatory diagram depicting another example of information stored in the person information storage unit 19. FIG. 4 depicts an example of information stored in the person information storage unit 19 in the case where the monitoring targets are persons, too.

In the example depicted in FIG. 4, the person information storage unit 19 stores, for each piece of person identification information (person ID), the identifier (person image ID) of the monitoring target imaging information from which the person has been extracted and the imaging time, in association with each other. The person information storage unit 19 may also store, in association with the identifier (person image ID) of the monitoring target imaging information, the camera name (e.g. imaging device identification information) of the camera that acquired the video and the probability (likelihood) of the monitoring target estimated from the acquired video, as depicted in FIG. 4 as an example.

The person identification information matching unit 15 matches monitoring target identification information, and identifies monitoring targets estimated to be the same. For example, in the case where face images of monitoring targets are extracted as monitoring target identification information, the person identification information matching unit 15 may match face images and identify persons estimated to be the same.

In detail, the person identification information matching unit 15 matches the monitoring target identification information included in the monitoring target imaging information stored in the person identification information storage unit 18 against the monitoring target identification information of each person stored in the person information storage unit 19, and determines whether or not the same person is stored in the person information storage unit 19.

Suppose the person identification information storage unit 18 stores the information depicted in FIG. 3 as an example. In the case of determining that the same person is stored in the person information storage unit 19, the person identification information matching unit 15 compares the imaging time included in the monitoring target imaging information with the earliest imaging time and latest imaging time of the person stored in the person information storage unit 19.

In the case where the imaging time is earlier than the earliest imaging time, the person identification information matching unit 15 requests the person information management unit 16 to update the earliest imaging time of the person with the imaging time. In the case where the imaging time is later than the latest imaging time, the person identification information matching unit 15 requests the person information management unit 16 to update the latest imaging time of the person with the imaging time. In the case where the imaging time is later than or equal to the earliest imaging time and earlier than or equal to the latest imaging time, the person identification information matching unit 15 does not perform the imaging time update process. The person identification information matching unit 15 also requests the person information management unit 16 to increase the imaging count of the person by 1.

In the case of determining that the same person is not stored in the person information storage unit 19, on the other hand, the person identification information matching unit 15 requests the person information management unit 16 to newly add the person to the person information storage unit 19 and set the earliest imaging time and the latest imaging time to the imaging time. The person identification information matching unit 15 also requests the person information management unit 16 to set the imaging count of the person to 1.

Suppose the person identification information storage unit 18 stores the information depicted in FIG. 4 as an example. In the case where the same person is stored in the person information storage unit 19, the person identification information matching unit 15 requests the person information management unit 16 to store information associating the person image ID and the imaging time with each other, in the person information storage unit 19 in association with the person ID of the person determined to be the same.

In the case of determining that the same person is not stored in the person information storage unit 19, on the other hand, the person identification information matching unit 15 requests the person information management unit 16 to assign a new person ID and store information associating the person image ID and the imaging time with the person ID in the person information storage unit 19.

In the case where the person identification information storage unit 18 stores the information depicted in FIG. 4 as an example, the person identification information matching unit 15 may request the person information management unit 16 to store the camera name (e.g. imaging device identification information) of the camera that captures the video, in the person information storage unit 19 together with the imaging time.

When matching monitoring target identification information, the person identification information matching unit 15 may calculate the probability (likelihood) of monitoring targets estimated to be the same. For example, suppose the person identification information matching unit 15 performs matching for a face image, and calculates the probability of determining the person as person A at 0.8, the probability of determining the person as person B at 0.3, and the probability of determining the person as person C at 0.2. In this case, the person identification information matching unit 15 may request the person information management unit 16 to store, for the person ID of each person for which the probability has been determined, information associating the person image ID, the imaging time, and the calculated probability with each other in the person information storage unit 19.

Since the method of comparing images and determining whether or not they match and the method of calculating the probability of the match are widely known, their detailed description is omitted here.

The long stayer estimation unit 14 identifies a desired target object from captured monitoring targets, using the imaging times included in the monitoring target imaging information of each monitoring target estimated to be the same. In detail, the long stayer estimation unit 14 identifies, as the target object, a monitoring target whose frequency of monitoring target imaging information with the imaging time included in a predetermined period is greater than or equal to a predetermined threshold or whose time width between imaging times in the predetermined period is greater than or equal to a predetermined time. The predetermined period is also referred to as "analysis time width".

The "time width between imaging times" mentioned here means the difference between any two imaging times selected in the predetermined period. In this exemplary embodiment, the "time width between imaging times" can be regarded as the width between any imaging times among the imaging times of the monitoring target captured in the predetermined period. Moreover, the "frequency of monitoring target imaging information with the imaging time included in a predetermined period" can be regarded as the frequency of imaging of the monitoring target in the predetermined period.

The reason for identifying the monitoring target that meets such a condition as the target object is as follows. In the following description, the case of identifying an unusually long stayer in a station is used as an example. The location subjected to the process of identifying an unusually long stayer is, however, not limited to a station. The location may be, for example, any range where staying for a long time is determined to be unusual, such as a predetermined area of a building or a commercial facility.

As an example, a criminal such as a pickpocket, a luggage lifter, or a molester is assumed to stay in a certain area for an unusually long time, unlike an ordinary passenger. In other words, an ordinary passenger typically moves from a ticket gate to a platform and then gets on a train. Such a passenger who moves in one direction is caught by a camera only for a limited time, and is unlikely to be caught by the same camera for a long time. Hence, a person who stays in a given area in the station for a long time can be regarded as an unusually long stayer.

As another example, in the case where a plurality of cameras are installed far from each other, even when it takes time to capture a target person by these cameras, his or her behavior seems to be usual, given the movement time. In the case where a plurality of cameras are installed near each other, on the other hand, it seems unusual to take time to capture a target person by these cameras. Hence, a person captured by the cameras over the time width defined between the cameras can be regarded as an unusually long stayer.

An unusually long stayer can also be determined depending on the property of the range captured by a camera. For example, regarding meeting spots or near benches, even when a person stays in one such place for a long time, his or her behavior does not seem to be particularly unusual. When a person wanders from one such place to another, however, his or her behavior seems to be unusual. Hence, a person whose frequency of being captured by a plurality of cameras exceeds a predetermined value can also be regarded as an unusually long stayer.

The long stayer estimation unit 14 estimates each unusually long stayer as defined above, and extracts persons who seem to be suspicious, as a gray list. Note that the unusually long stayer is not limited to the above-defined monitoring targets. For example, in the case where cameras are installed at the entrance and the exit, if a person is caught only by one camera, his or her behavior seems to be unusual, and accordingly the person may be defined as an unusually long stayer.

A monitoring target whose time width between imaging times is extremely long may not be an unusually long stayer. For example, in the case of monitoring persons in a station, there is a possibility that the same person is captured by a camera around the start of office hours and around the end of office hours. The movement of such a person seems to be usual. The long stayer estimation unit 14 may accordingly exclude any monitoring target whose time width between imaging times is extremely long, from the target object. To exclude such a monitoring target, an appropriate analysis time width may be set beforehand depending on the property of monitoring targets.

The long stayer estimation unit 14 may identify not only a person but also an object such as a car that is parked for an unusually long time. In this case, the object staying for an unusually long time can be regarded as an unusually long staying object. The following describes a method whereby the long stayer estimation unit 14 identifies, as a desired target object, an unusually long stayer or an unusually long staying object from monitoring targets.

A method whereby the long stayer estimation unit 14 identifies the target object based on the time width between imaging times in the predetermined period is described first. The long stayer estimation unit 14 may identify, as the target object, a monitoring target whose time width between the earliest imaging time and the latest imaging time, among times widths between imaging times in the predetermined period, is greater than or equal to a predetermined threshold specified by a determination condition. The predetermined threshold is hereafter also referred to as "long stay determination time".

This is based on the assumption that a person whose difference between the earliest imaging time and the latest imaging time (i.e. the maximum imaging time interval) is extremely long is an unusually long stayer.

Figure 5:
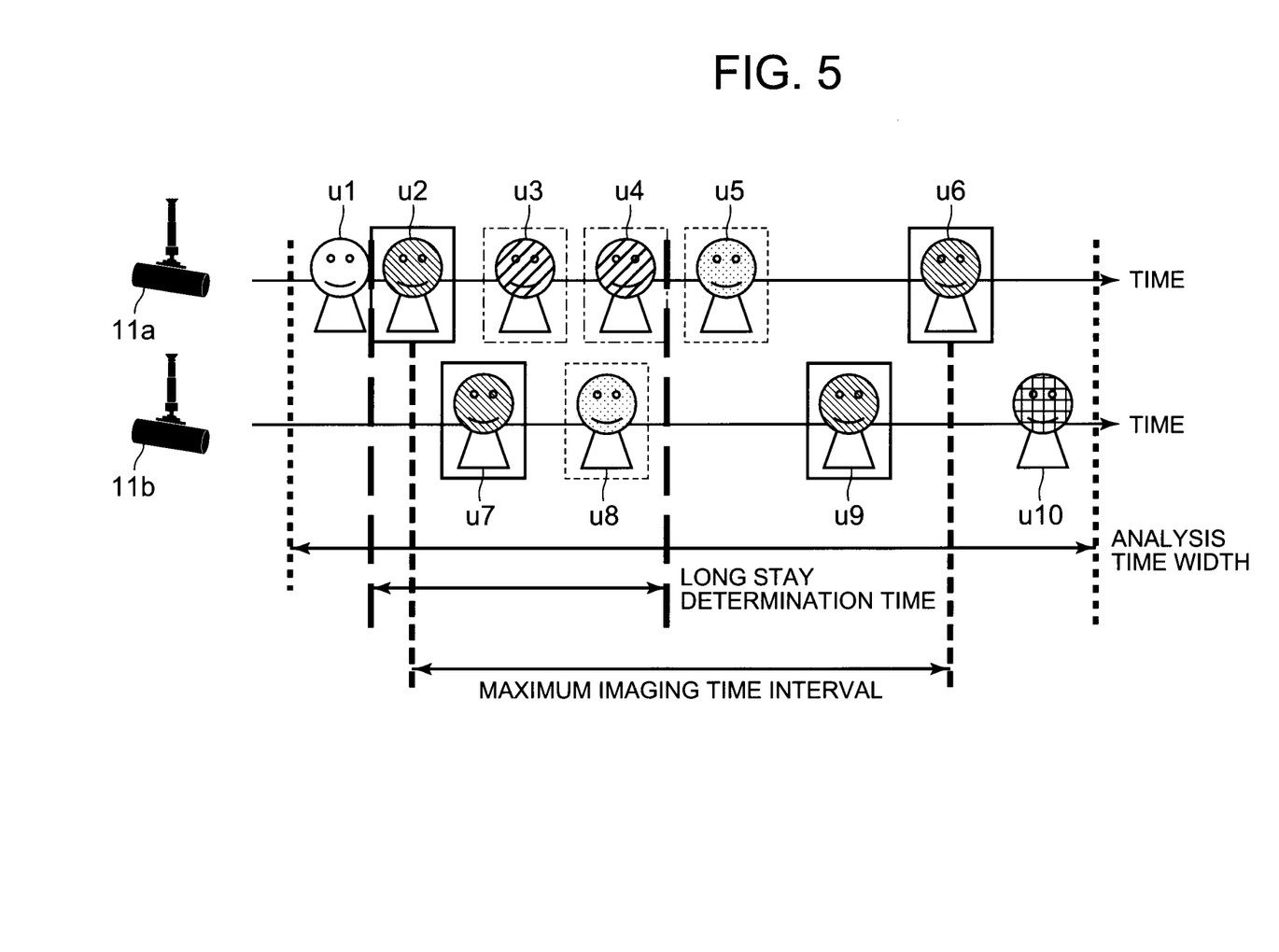
FIG. 5 It is an explanatory diagram depicting an example of the operation of determining the stay time of each monitoring target.

FIG. 5 is an explanatory diagram depicting an example of the operation of determining the stay time of each monitoring target. In the example depicted in FIG. 5, persons u1 to u10 as monitoring targets have been identified in the direction of the time axis, from video captured by two image acquisition units 11a and 11b. The period between two dotted lines is the analysis time width, and the period between long dashed lines is the long stay determination time. The range for identifying a target object, such as 3 hours or 1 day, is designated as the analysis time width, and the time used to determine unusual stay, such as 30 minutes, is designated as the long stay determination time.

For example, regarding persons u3 and u4 estimated to be the same person, the width between imaging times is shorter than the long stay determination time. Accordingly, the long stayer estimation unit 14 does not determine person u3 (u4) as an unusually long stayer. Likewise, regarding persons u5 and u8 estimated to be the same person, though the images were captured by the different video acquisition units, the width between the imaging times is shorter than the long stay determination time. Accordingly, the long stayer estimation unit 14 does not determine person u5 (u8) as an unusually long stayer.

Regarding persons u2, u6, u7, and u9 estimated to be the same person, on the other hand, the difference between the earliest imaging time and the latest imaging time is longer than the long stay determination time. Accordingly, the long stayer estimation unit 14 determines person u2 (u6, u7, u9) as an unusually long stayer.

One overall determination condition for specifying the long stay determination time may be set regardless of the number of video acquisition units 11. In this case, the determination condition is a condition for determining the stay time of each monitoring target in the entire facility in which the video acquisition units 11 are installed.

Alternatively, the determination condition for specifying the long stay determination time may be set for each video acquisition unit 11. In this case, the determination condition is a condition for determining the stay time of each monitoring target captured in the imaging range of each video acquisition unit 11.

Alternatively, the determination condition for specifying the long stay determination time may be set between the video acquisition units 11. In this case, the determination condition is a condition for determining, when each monitoring target moved between the imaging ranges of the plurality of video acquisition units 11, the stay time between the imaging ranges.

Figure 6:
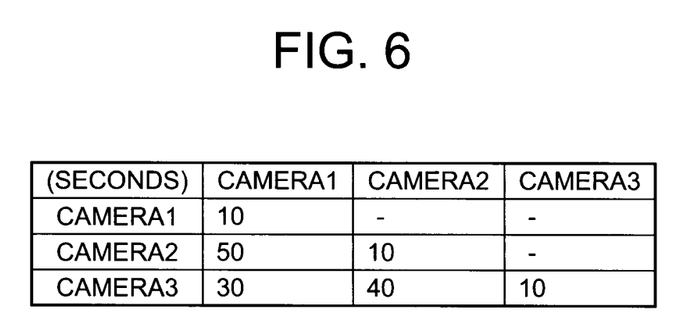
FIG. 6 It is an explanatory diagram depicting an example of determination conditions for specifying time widths.

FIG. 6 is an explanatory diagram depicting an example of determination conditions for specifying time widths. A threshold of the time width set for each video acquisition unit 11 and a threshold of the time width set between the video acquisition units 11 are depicted in the example in FIG. 6. In the example in FIG. 6, the acceptable stay time in the imaging range of camera 1 is 10 seconds, and the acceptable stay time between the imaging ranges of cameras 1 and 2 is 50 seconds.

Another method whereby the long stayer estimation unit 14 identifies the target object based on the time width between imaging times in the predetermined period is described next. The long stayer estimation unit 14 may identify, as the target object, a monitoring target whose time width between successive imaging times, among times widths between imaging times in the predetermined period, is greater than or equal to a predetermined threshold specified by a determination condition. This is based on the assumption that a person whose time width between imaging times by different video acquisition units 11 is extremely long is an unusually long stayer.

One overall determination condition for specifying the condition of the time width between successive imaging times may be set regardless of the number of video acquisition units 11. In this case, the determination condition is a condition for determining the time of movement of each monitoring target in the facility in which the video acquisition units 11 are installed.

Alternatively, the determination condition for specifying the condition of the time width between successive imaging times may be set for each video acquisition unit 11. In this case, the determination condition is a condition for determining the acceptable stay time of each monitoring target according to the property of the imaging range of each video acquisition unit 11.

Alternatively, the determination condition for specifying the condition of the time width between successive imaging times may be set between the video acquisition units 11. In this case, the determination condition is a condition for determining the time of movement of each monitoring target between the imaging ranges of the plurality of video acquisition units 11. For example, in the case where the time width between the imaging times by the video acquisition units 11 installed near each other is extremely long, the person seems to be an unusually long stayer.

Figure 7:
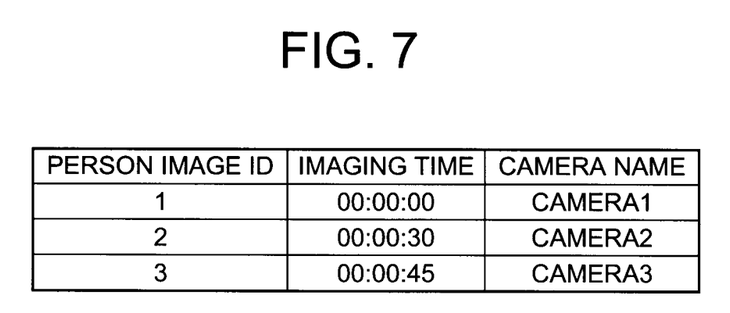
FIG. 7 It is an explanatory diagram depicting a specific example of information stored in the person information storage unit 19.

The following describes a method of identifying the target object based on the determination condition for specifying the condition of the time width between successive imaging times, with reference to FIGS. 6 and 7. FIG. 7 is an explanatory diagram depicting a specific example of information stored in the person information storage unit 19. Here, three video acquisition units 11 are referred to as camera 1, camera 2, and camera 3. Consider the case where the condition depicted in FIG. 6 as an example has been set as the determination condition for specifying the time width.

Suppose camera 1 captured video identified by person image ID 1 at 00:00:00, and then camera 2 captured video identified by person image ID 2 at 00:00:30. In the example depicted in FIG. 6, the condition set as the time width between cameras 1 and 2 is 50 seconds. Since the difference between the two imaging times is 30 seconds, the long stayer estimation unit 14 does not identify the monitoring target as the target object.

Further, suppose camera 3 captured video identified by person image ID 3 at 00:00:45. In the example depicted in FIG. 6, the condition set as the time width between cameras 2 and 3 is 40 seconds. Since the difference between the two imaging times is 15 seconds, the long stayer estimation unit 14 does not identify the monitoring target as the target object.

Suppose, on the other hand, camera 3 captured the video identified by person image ID 3 at 00:02:00. Since the difference between the two imaging times is 90 seconds, the long stayer estimation unit 14 identifies the monitoring target as the target object.

Although the above describes the case where the determination condition for specifying the condition of the long stay determination time is set beforehand, the determination condition may be dynamically generated based on the imaging times of monitoring targets not identified as the target object.

The following describes examples of the determination condition generation method. The person information management unit 16 may keep statistics about the stay time of each monitoring target whose stay time is shorter than the long stay determination time, to calculate the long stay determination time.

In detail, the person information management unit 16 may calculate, from the information of each monitoring target subjected to the statistics, the stay time mean in the maximum imaging time interval or the time interval between the video acquisition units 11, and calculate the time which is a constant multiple of (e.g. double) the stay time mean as the long stay determination time.

As an alternative, the person information management unit 16 may calculate, from the information of each monitoring target subjected to the statistics, the stay time mean and variance in the maximum imaging time interval or the time interval between the video acquisition units 11, and calculate a threshold of the time interval in which a predetermined proportion (e.g. 5%) of people are determined as long stayers, as the long stay determination time.

The method of calculating the long stay determination time is not limited to these methods. For example, the movement speed of each monitoring target in video captured by one video acquisition unit 11 may be measured, with the long stay determination time being calculated based on the movement speed and the distance between the video acquisition units 11.

Dynamically calculating the long stay determination time in this way enables use of an appropriate determination condition according to the actual situation, as a result of which the target object can be identified more appropriately from monitoring targets.

A method whereby the long stayer estimation unit 14 identifies the target object based on the imaging frequency of each monitoring target in the predetermined period is described next. The long stayer estimation unit 14 may identify, as the target object, a monitoring target whose frequency of monitoring target imaging information with the imaging time included in the predetermined period is greater than or equal to a predetermined threshold. This is based on the assumption that a monitoring target captured extremely frequently is an unusually long stayer.

Figure 8:
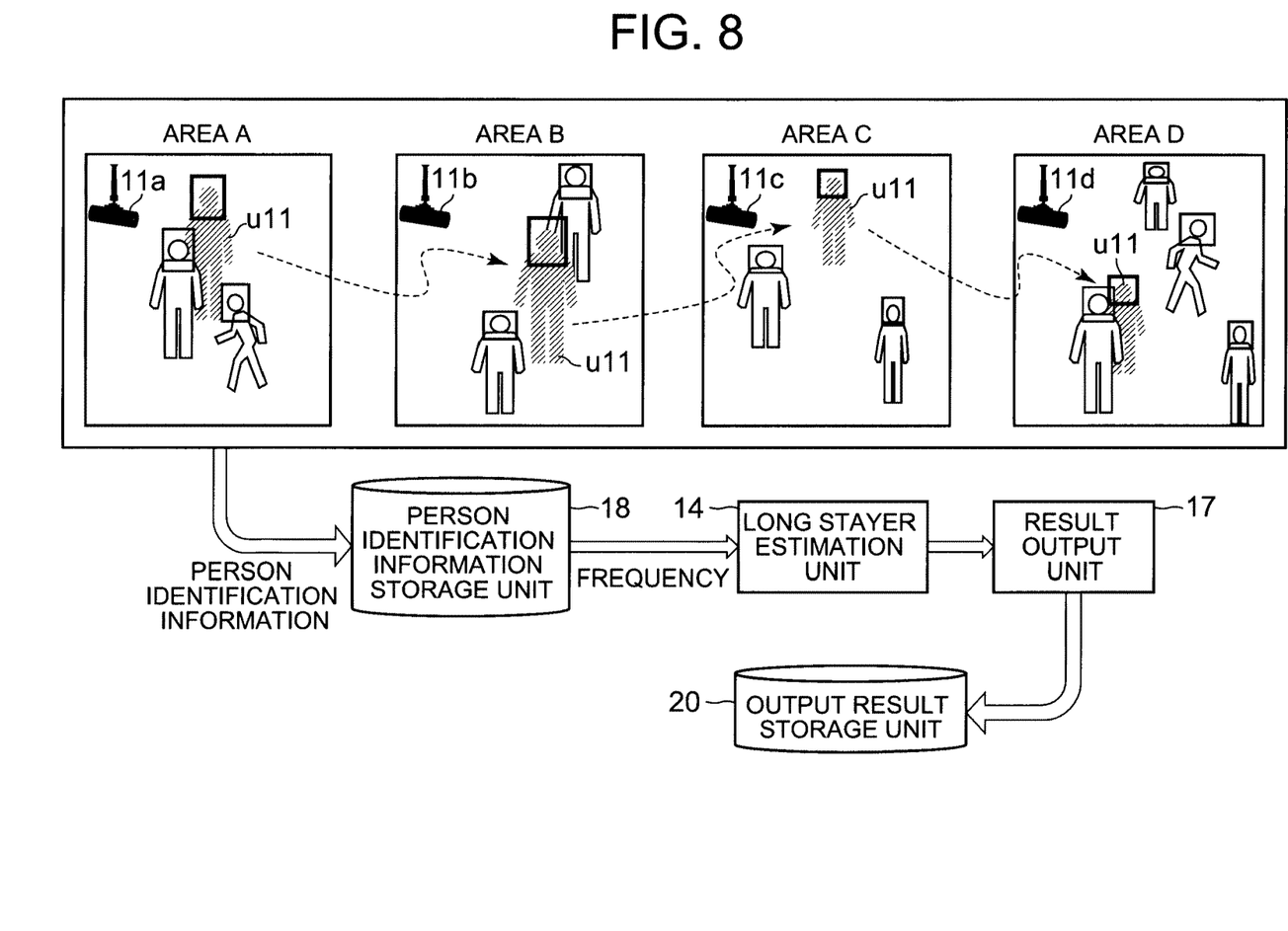
FIG. 8 It is an explanatory diagram depicting an example of the operation of capturing a monitoring target by a plurality of video acquisition units 11.

FIG. 8 is an explanatory diagram depicting an example of the operation of capturing a monitoring target by a plurality of video acquisition units 11. In the example depicted in FIG. 8, video acquisition units 11a, 11b, 11c, and 11d respectively capture areas A, B, C, and D.

When any person is detected from captured video, the person identification information of each person is extracted and stored in the person identification information storage unit 18. In the example depicted in FIG. 8, person u11 was captured in video of each of areas A, B, C, and D. Accordingly, four entries of the person identification information relating to person u11 are registered in the person identification information storage unit 18. Based on this registration frequency, the long stayer estimation unit 14 identifies person u11 from monitoring target persons, as the target object. The result output unit 17 outputs the identified target object to, for example, an output result storage unit 20.

One overall determination condition for specifying the condition of the frequency may be set regardless of the number of video acquisition units 11. In this case, the determination condition is a condition for determining the imaging frequency of each monitoring target in the entire facility in which the video acquisition units 11 are installed.

Alternatively, the determination condition for specifying the condition of the frequency may be set for each video acquisition unit 11. In this case, the determination condition is a condition for determining the imaging frequency of each monitoring target in the imaging range of each video acquisition unit 11.

Alternatively, the determination condition for specifying the condition of the frequency may be set for each group of any video acquisition units 11. In this case, the determination condition is a condition for determining the imaging frequency of each monitoring target in the imaging ranges of the video acquisition units 11 belonging to the group.

For example, in the case where a monitoring target was captured a plurality of times in one meeting spot, the monitoring target does not seem to be an unusually long stayer. In the case where a monitoring target was captured a plurality of times in a plurality of meeting spots, however, the monitoring target seems to be an unusually long stayer. Such an unusually long stayer can be identified by setting the condition relating to any video acquisition units 11 that are grouped together.

In the case where the person identification information matching unit 15 calculates the probability (likelihood) of monitoring targets estimated to be the same, the long stayer estimation unit 14 may identify the target object using the frequency calculated based on the likelihood. For example, suppose two entries of information of a monitoring target are registered in the person information storage unit 19. In the case where the likelihood of the monitoring target is 0.5 in each entry, the long stayer estimation unit 14 may determine the frequency as 1 (=0.5×2), and identify the target object.

In the case where the person identification information matching unit 15 calculates the likelihood, the long stayer estimation unit 14 may perform the estimation process only on monitoring target imaging information with the likelihood being greater than or equal to a predetermined value. This is equally applicable when the long stayer estimation unit 14 identifies the target object based on the time width between imaging times in the predetermined period. In detail, the long stayer estimation unit 14 may calculate the time width between imaging times included in monitoring target imaging information with the likelihood being greater than or equal to the predetermined value, for a monitoring target.

The long stayer estimation unit 14 generates a list of images, imaging device identification information, imaging times, and the like of the identified target object, and provides the list to the result output unit 17.

The result output unit 17 outputs the identified target object by a given method. For example, the result output unit 17 may store the output result in the output result storage unit 20. The result output unit 17 may also extract a common monitoring target extracted in different times or different days, from information stored in the output result storage unit 20. Since such a target object particularly needs to be observed, the result output unit 17 may, for example, output the information of the person as a habitual unusually long stayer.

The person identification information analysis unit 12, the person identification information management unit 13, the long stayer estimation unit 14, the person identification information matching unit 15, the person information management unit 16, and the result output unit 17 are realized, for example, by a CPU of a computer operating according to a program (target object identifying program). For instance, the program may be stored in a storage unit (not depicted) in the target object identifying device, with the CPU reading the program and, according to the program, operating as the person identification information analysis unit 12, the person identification information management unit 13, the long stayer estimation unit 14, the person identification information matching unit 15, the person information management unit 16, and the result output unit 17.

Alternatively, the person identification information analysis unit 12, the person identification information management unit 13, the long stayer estimation unit 14, the person identification information matching unit 15, the person information management unit 16, and the result output unit 17 may each be realized by dedicated hardware. The person identification information storage unit 18 and the person information storage unit 19 are realized, for example, by a magnetic disk or the like.

Figure 9:
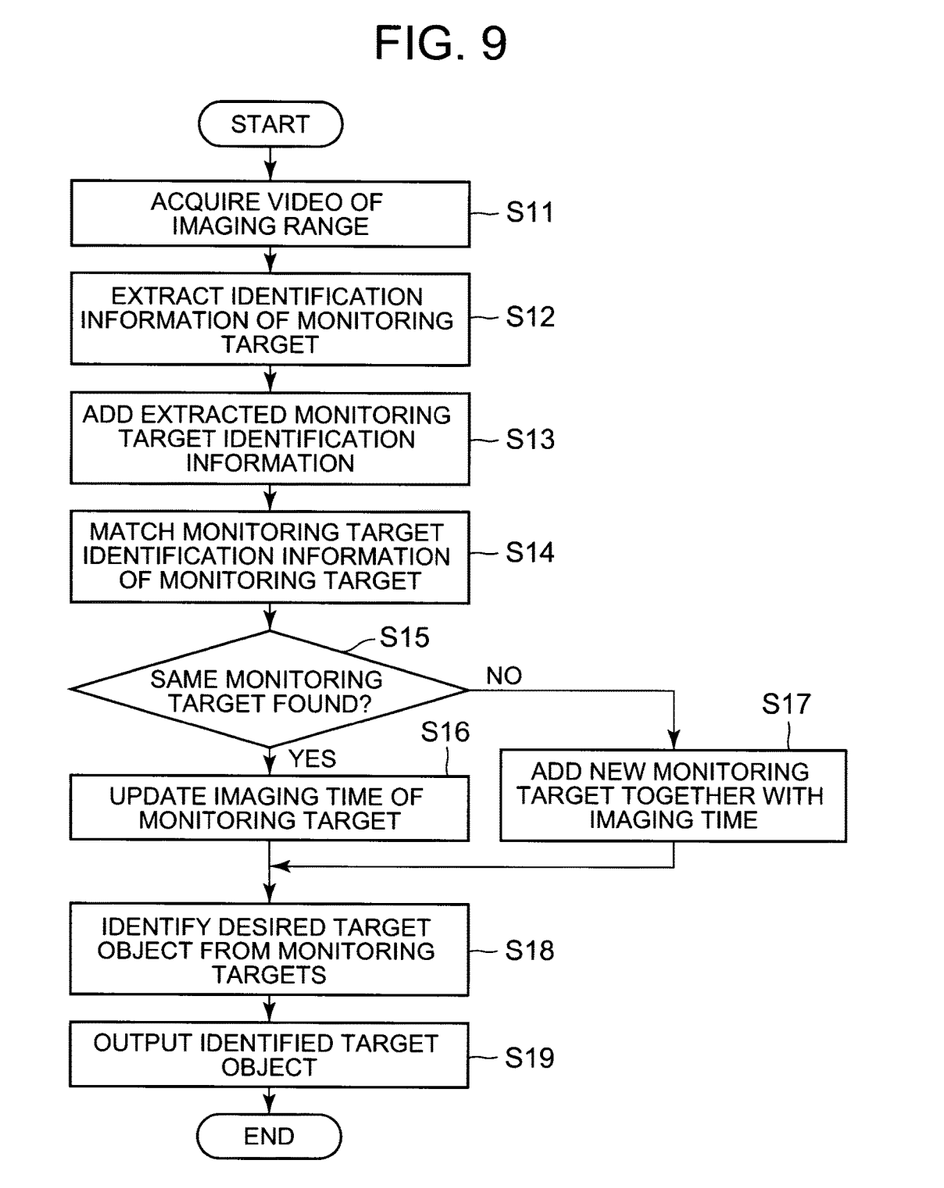
FIG. 9 It is a flowchart depicting an example of the operation of the target object identifying device.

The following describes the operation of the target object identifying device in this exemplary embodiment. FIG. 9 is a flowchart depicting an example of the operation of the target object identifying device in this exemplary embodiment.

First, the video acquisition unit 11 acquires video of its imaging range (step S11), and outputs the captured video to the person identification information analysis unit 12. Upon detecting a monitoring target from the received video, the person identification information analysis unit 12 extracts the identification information of the monitoring target (step S12), and stores the extracted monitoring target identification information in the person identification information storage unit 18 (step S13).

The person identification information matching unit 15 matches the monitoring target identification information stored in the person identification information storage unit 18, against the monitoring target identification information of each monitoring target stored in the person information storage unit 19 (step S14). In the case where the same monitoring target is found (step S15: Yes), the person information management unit 16 updates the imaging time of the monitoring target (step S16). In the case where the same monitoring target is not found (step S15: No), on the other hand, the person information management unit 16 stores the monitoring target in the person information storage unit 19 as a new monitoring target, together with the imaging time (step S17).

The long stayer estimation unit 14 identifies a desired target object from monitoring targets, using the imaging times included in the monitoring target imaging information of the identified same persons (step S18). The long stayer estimation unit 14 identifies the target object based on the time width between imaging times or the frequency of imaging times. The result output unit 17 outputs the identified target object (step S19).

As described above, according to this exemplary embodiment, the person identification information analysis unit 12 analyzes a monitoring target shown in video, and extracts the corresponding monitoring target imaging information including the monitoring target identification information and the imaging time. The person identification information matching unit 15 matches the monitoring target identification information, and identifies the monitoring target estimated to be the same. The long stayer estimation unit 14 identifies a desired target object from monitoring targets, using the imaging times included in the monitoring target imaging information of each identified monitoring target.

For example, the long stayer estimation unit 14 identifies, as the target object, a monitoring target whose frequency of monitoring target imaging information with the imaging time included in the predetermined period is greater than or equal to the predetermined threshold or whose time width between imaging times in the predetermined period is greater than or equal to the predetermined time. In this way, even in the case where the monitoring range is wide or crowded, a target object present in the range for an unusually long time can be identified from monitoring targets.

For example, suppose the target object identifying device in this exemplary embodiment is used in a station. First, the person identification information analysis unit 12 acquires information for identifying a face or a person, from video captured by one or more video acquisition units 11 installed in the station. The person identification information matching unit 15 matches the information for identifying the person against information acquired in different times or by a plurality of cameras, to calculate the time width or frequency of imaging of the same person. Thus, a list of imaging times can be generated for each monitoring target, even in the case where information of any suspicious person is not provided beforehand.

The long stayer estimation unit 14 finds an unusually long stayer in the facility different from ordinary users, using the time width, the frequency, or the like. There is accordingly no need to install cameras to cover the entire monitoring target area and, even in the case where part of monitoring targets cannot be captured in a crowded situation, monitoring targets can be identified from other imaging times.

Figure 10:
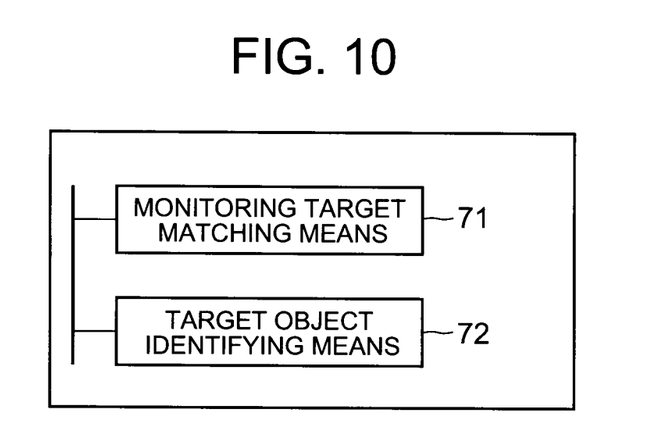
FIG. 10 It is a block diagram schematically depicting the target object identifying device according to the present invention.

The following gives an overview of the present invention. FIG. 10 is a block diagram schematically depicting the target object identifying device according to the present invention. The target object identifying device according to the present invention includes: monitoring target matching means 71 (e.g. the person identification information matching unit 15) which matches monitoring targets shown in video captured by one or more imaging devices (e.g. the video acquisition unit 11), and identifies monitoring targets estimated to be the same monitoring target, as an identified monitoring target; and target object identifying means 72 (e.g. the long stayer estimation unit 14) which identifies a desired target object from one or more identified monitoring targets, using imaging times of each of the one or more identified monitoring targets.

With such a structure, even in the case where the monitoring range is wide or crowded, a target object present in the range for an unusually long time can be identified from monitoring targets.

The target object identifying means 72 may identify, as the target object, an identified monitoring target whose frequency of imaging times in a predetermined period (e.g. the analysis time width) is greater than or equal to a predetermined frequency or whose time width between imaging times in the predetermined period is greater than or equal to a predetermined time (e.g. the long stay determination time).

The target object identifying means 72 may identify, as the target object, an identified monitoring target whose time width between an earliest imaging time and a latest imaging time, among time widths between imaging times in a predetermined period, is greater than or equal to a predetermined threshold (e.g. the long stay determination time) specified by a determination condition.

The target object identifying means 72 may identify the target object based on the determination condition (e.g. the determination condition depicted in FIG. 6) for specifying, for each imaging device, a condition of the time width between the earliest imaging time and the latest imaging time.

The target object identifying device may include determination condition generation means (e.g. the person information management unit 16) which generates the determination condition for specifying a condition of the time width between the earliest imaging time and the latest imaging time, based on imaging times of monitoring targets not identified as the target object. Dynamically calculating the determination condition in this way enables use of an appropriate determination condition according to the actual situation, as a result of which the target object can be identified more appropriately from monitoring targets.

The target object identifying means 72 may identify, as the target object, an identified monitoring target whose time width between successive imaging times, among time widths between imaging times in a predetermined period, is greater than or equal to a predetermined threshold specified by a determination condition.

The target object identifying means 72 may identify, as the target object, the identified monitoring target whose time width between the successive imaging times meets the determination condition between imaging devices.

The target object identifying means 72 may identify the target object based on a determination condition for specifying, for each imaging device, a frequency of imaging times of an identified monitoring target included in a predetermined period.

The target object identifying means 72 may identify the target object based on a determination condition for specifying, for each predetermined imaging device group, the frequency of the imaging times of the identified monitoring target included in the predetermined period.

The monitoring target matching means 71 may calculate a likelihood of the monitoring targets estimated to be the same monitoring target, and the target object identifying means 72 may identify the target object, based on the frequency calculated based on the likelihood.

The monitoring target matching means 71 may match face images extracted from the video captured by the one or more imaging devices, and identify monitoring targets estimated to be the same person.

The monitoring target matching means 71 may extract information (monitoring target identification information) for identifying each monitoring target, before matching monitoring targets shown in the video. In detail, the monitoring target matching means 71 may execute the process performed by the person identification information analysis unit 12 in Exemplary Embodiment. In the case where the monitoring targets can be matched without using monitoring target identification information, however, the explicit extraction process for monitoring target identification information is not necessarily required. The following describes a target object identifying device including the structure for extracting monitoring target identification information.

Figure 11:
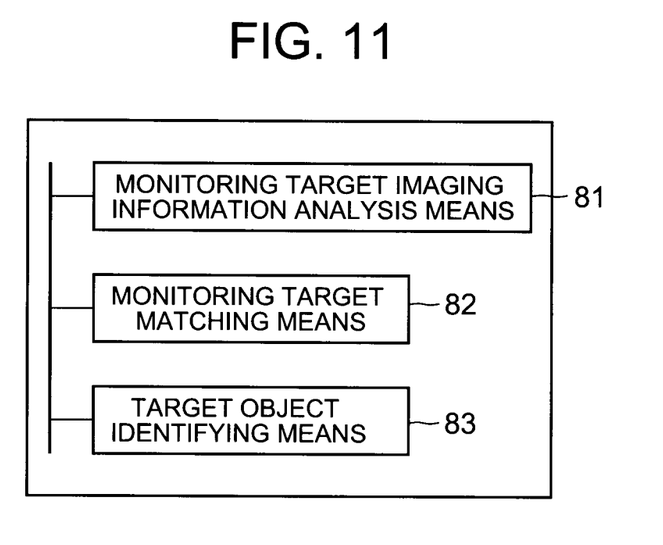
FIG. 11 It is another block diagram schematically depicting the target object identifying device according to the present invention.

FIG. 11 is another block diagram schematically depicting the target object identifying device according to the present invention. The target object identifying device according to the present invention includes: monitoring target imaging information analysis means 81 (e.g. the person identification information analysis unit 12) which analyzes monitoring targets (e.g. persons, cars) shown in video captured by one or more imaging devices (e.g. the video acquisition unit 11), and extracts monitoring target imaging information that includes monitoring target identification information (e.g. face image, car registration plate) used for identifying each monitoring target and an imaging time at which the monitoring target was captured; monitoring target matching means 82 (e.g. the person identification information matching unit 15) which matches the monitoring target identification information, and identifies monitoring targets estimated to be the same monitoring target; and target object identifying means 83 (e.g. the long stayer estimation unit 14) which identifies a desired target object (e.g. an unusually long stayer) from captured monitoring targets, using imaging times included in monitoring target imaging information of each identified monitoring target.

With such a structure, too, even in the case where the monitoring range is wide or crowded, a target object present in the range for an unusually long time can be identified from monitoring targets.

The target object identifying means 83 may identify, as the target object, a monitoring target whose frequency of monitoring target imaging information with an imaging time included in a predetermined period (e.g. the analysis time width) is greater than or equal to a predetermined threshold or whose time width between imaging times in the predetermined period is greater than or equal to a predetermined time (e.g. the long stay determination time).

In detail, the target object identifying means 83 may identify, as the target object, a monitoring target whose time width between an earliest imaging time and a latest imaging time, among time widths between imaging times in a predetermined period, is greater than or equal to a predetermined threshold (e.g. the long stay determination time) specified by a determination condition.

The monitoring target imaging information analysis means 81 may extract the monitoring target imaging information including imaging device identification information used for identifying an imaging device that captured the monitoring target. Here, the target object identifying means 83 may identify the target object based on the determination condition (e.g. the determination condition depicted in FIG. 6) for specifying, for each imaging device, a condition of the time width between the earliest imaging time and the latest imaging time.

The target object identifying device may include determination condition generation means (e.g. the person information management unit 16) which generates the determination condition for specifying a condition of the time width between the earliest imaging time and the latest imaging time, based on imaging times of monitoring targets not identified as the target object.

The target object identifying means 83 may identify, as the target object, a monitoring target whose time width between successive imaging times, among time widths between imaging times in a predetermined period, is greater than or equal to a predetermined threshold specified by a determination condition.

The monitoring target imaging information analysis means 81 may extract the monitoring target imaging information including imaging device identification information used for identifying an imaging device that captured the monitoring target. The target object identifying means 83 may identify, as the target object, the monitoring target whose time width between the successive imaging times in the monitoring target imaging information meets the determination condition between imaging devices.

The monitoring target imaging information analysis means 81 may extract the monitoring target imaging information including imaging device identification information used for identifying an imaging device that captured the monitoring target. The target object identifying means 83 may identify the target object based on a determination condition for specifying, for each imaging device, a condition of the frequency of the monitoring target imaging information with the imaging time included in the predetermined period.

The target object identifying means 83 may identify the target object based on a determination condition for specifying, for each predetermined imaging device group, a condition of the frequency of the monitoring target imaging information with the imaging time included in the predetermined period.

The monitoring target matching means 82 may calculate a likelihood (probability) of the monitoring targets estimated to be the same monitoring target. The target object identifying means 83 may identify the target object using the frequency calculated based on the likelihood.

The monitoring target imaging information analysis means 81 may extract a face image of each monitoring target as the monitoring target identification information. The monitoring target matching means 82 may match face images, and identify monitoring targets estimated to be the same person. With such a structure, a person staying in the monitoring range for an unusually long time can be identified.

Although the present invention has been described with reference to the foregoing exemplary embodiment and examples, the present invention is not limited to the foregoing exemplary embodiment and examples. Various changes understandable by those skilled in the art within the scope of the present invention can be made to the structures and details of the present invention.

This application claims priority based on Japanese Patent Application No. 2013-072178 filed on Mar. 29, 2013, the disclosure of which is incorporated herein in its entirety.

INDUSTRIAL APPLICABILITY

The present invention is suitable for use in, for example, a video analysis system for capturing persons in a specific facility by one or more surveillance cameras and analyzing the captured video to automatically find any long stayer.

REFERENCE SIGNS LIST 11, 11a to 11d video acquisition unit
12 person identification information analysis unit
13 person identification information management unit
14 long stayer estimation unit
15 person identification information matching unit
16 person information management unit
17 result output unit
18 person identification information storage unit
19 person information storage unit
20 output result storage unit
u1 to u11 person

What is claimed is:
1. A target object identifying device comprising:
a processor;
a non-transitory computer-readable data storage medium storing computer-executable code that the processor executes to:
match monitoring targets shown in video captured by one or more imaging devices, identify monitoring targets estimated to be the same monitoring target, as an identified monitoring target, and identify other monitoring targets estimated to be different monitoring targets and responsively add the other monitoring targets within a first storage device upon which basis further matching of additional monitoring targets is performed;
identify a desired target object from one or more identified monitoring targets, using imaging times of each of the one or more identified monitoring targets, the desired target being a suspicious person or object; and
store the identified desired target object within a second storage device, wherein the desired target object is identified as the identified monitoring target whose frequency of monitoring target imaging information with an imaging time in a predetermined period is greater than or equal to a predetermined threshold,
wherein the desired target object is identified as the identified monitoring target whose time width between an earliest imaging time and a latest imaging time, among time widths between imaging times in a predetermined period, is greater than or equal to a predetermined threshold specified by a determination condition,
wherein the processor executes the computer-executable code to further generate the determination condition for specifying a condition of the time width between the earliest imaging time and the latest imaging time, based on imaging times of monitoring targets not identified as the desired target object.

2. The target object identifying device according to claim 1, wherein the desired target object is identified based on the determination condition for specifying, for each imaging device, a condition of the time width between the earliest imaging time and the latest imaging time.

3. The target object identifying device according to claim 1, wherein the desired target object is identified as the identified monitoring target whose time width between the successive imaging times meets the determination condition between imaging devices.

4. The target object identifying device according to claim 1, wherein the desired target object is identified based on a determination condition for specifying, for each imaging device, a frequency of imaging times of the identified monitoring target included in a predetermined period.

5. The target object identifying device according to claim 4, wherein the desired target object is identified based on a determination condition for specifying, for each predetermined imaging device group, the frequency of the imaging times of the identified monitoring target included in the predetermined period.

6. The target object identifying device according to claim 4, wherein the processor is to calculates a likelihood of the monitoring targets estimated to be the same monitoring target, and
wherein the desired target object is identified based on the frequency calculated based on the likelihood.

7. The target object identifying device according to claim 1, wherein the processor is to match face images extracted from the video captured by the one or more imaging devices, and identifies monitoring targets estimated to be the same person.

8. A target object identifying method comprising:
matching monitoring targets shown in video captured by one or more imaging devices, identifying monitoring targets estimated to be the same monitoring target, as an identified monitoring target, and identifying other monitoring targets estimated to be different monitoring targets and responsively adding the other monitoring targets within a first storage device upon which basis further matching of additional monitoring targets is performed;
identifying a desired target object from one or more identified monitoring targets, using imaging times of each of the one or more identified monitoring targets, the desired target being a suspicious person or object; and
storing the identified desired target object within a second storage device, wherein the identified monitoring target whose frequency of monitoring target imaging information with an imaging time in a predetermined period is greater than or equal to a predetermined threshold is identified as the target object,
wherein the desired target object is identified as the identified monitoring target whose time width between an earliest imaging time and a latest imaging time, among time widths between imaging times in a predetermined period, is greater than or equal to a predetermined threshold specified by a determination condition,
wherein the method further comprises generating the determination condition for specifying a condition of the time width between the earliest imaging time and the latest imaging time, based on imaging times of monitoring targets not identified as the desired target object.

9. A non-transitory computer readable information recording medium storing a target object identifying program, when executed by a processor, that performs a method for:

matching monitoring targets shown in video captured by one or more imaging devices, identifying monitoring targets estimated to be the same monitoring target, as an identified monitoring target, and identifying other monitoring targets estimated to be different monitoring targets and responsively adding the other monitoring targets within a first storage device upon which basis further matching of additional monitoring targets is performed;

identifying a desired target object from one or more identified monitoring targets, using imaging times of each of the one or more identified monitoring targets, the desired target being a suspicious person or object; and storing the identified desired target object within a second storage device, wherein the identified monitoring target whose frequency of monitoring target imaging information with an imaging time in a predetermined period is greater than or equal to a predetermined threshold is identified as the target object, wherein the desired target object is identified as the identified monitoring target whose time width between an earliest imaging time and a latest imaging time, among time widths between imaging times in a predetermined period, is greater than or equal to a predetermined threshold specified by a determination condition, wherein the method further comprises generating the determination condition for specifying a condition of the time width between the earliest imaging time and the latest imaging time, based on imaging times of monitoring targets not identified as the desired target object.

* * * * *